United States Patent
Chi et al.

(10) Patent No.: US 8,518,528 B2
(45) Date of Patent: Aug. 27, 2013

(54) LOW EXPANSION CORROSION RESISTANT CERAMIC FOAM FILTERS FOR MOLTEN ALUMINUM FILTRATION

(75) Inventors: Feng Chi, Greer, SC (US); David P. Haack, Hendersonville, NC (US); Leonard S. Aubrey, Hendersonville, NC (US)

(73) Assignee: Porvair PLC, Norfolk (GB)

( * ) Notice: Subject to any disclaimer, the term of this patent is extended or adjusted under 35 U.S.C. 154(b) by 911 days.

(21) Appl. No.: 12/293,317

(22) PCT Filed: Apr. 2, 2007

(86) PCT No.: PCT/US2007/008111
§ 371 (c)(1),
(2), (4) Date: Dec. 30, 2009

(87) PCT Pub. No.: WO2007/120483
PCT Pub. Date: Oct. 25, 2007

(65) Prior Publication Data
US 2010/0113244 A1 May 6, 2010

Related U.S. Application Data

(60) Provisional application No. 60/788,391, filed on Mar. 31, 2006.

(51) Int. Cl.
*C03C 14/00* (2006.01)
*C04B 35/053* (2006.01)
*C04B 35/111* (2006.01)
*C04B 35/80* (2006.01)
*C04B 35/14* (2006.01)
*B05D 3/02* (2006.01)

(52) U.S. Cl.
USPC .............. 428/304.4; 428/293.4; 428/312.6; 428/312.8; 428/315.5; 428/315.7; 428/317.9; 428/332; 266/216; 501/32; 501/77; 501/80; 501/82; 501/128; 501/133; 501/153; 501/154

(58) Field of Classification Search
USPC .................. 210/660, 767; 266/227; 75/407, 75/412
See application file for complete search history.

(56) References Cited

U.S. PATENT DOCUMENTS

| 3,574,646 | A | * | 4/1971 | Wismer et al. | 501/82 |
| 3,906,147 | A | * | 9/1975 | Pirooz | 174/84 R |
| 5,145,806 | A | * | 9/1992 | Shirakawa et al. | 501/80 |
| 6,036,743 | A | * | 3/2000 | Butcher et al. | 75/407 |
| 6,521,015 | B1 | * | 2/2003 | Eckert | 75/307 |
| 2002/0037798 | A1 | * | 3/2002 | Watanabe et al. | 501/80 |
| 2003/0114293 | A1 | * | 6/2003 | Mizuno et al. | 501/80 |
| 2006/0018806 | A1 | * | 1/2006 | Ziebarth et al. | 422/177 |

OTHER PUBLICATIONS

International Search Report, PCT/US07/08111, Jan. 15, 2008, J. Kim (3pgs).

* cited by examiner

*Primary Examiner* — David Sample
(74) *Attorney, Agent, or Firm* — Joseph T. Guy; Perkins Law Firm, LLC (57) ABSTRACT

A ceramic foam filter for molten aluminum alloys comprising an alumina silicate rich core and a boron glass shell and a chemical composition comprising: 20-70 wt % $Al_2O_3$, 20-60 wt % $SiO_2$, 0-10 wt % CaO, 0-10 wt %; MgO and 2-20 wt % $B_2O_3$.

60 Claims, 5 Drawing Sheets

LOW EXPANSION CORROSION RESISTANT CERAMIC FOAM FILTERS FOR MOLTEN ALUMINUM FILTRATION

CROSS-REFERENCE TO RELATED APPLICATIONS

The present application claims priority to U.S. Provisional Appl. No. 60/788,391 filed Mar. 31, 2006 which is pending.

BACKGROUND

The production of aluminum ingots and billets for fabrication into high quality aluminum products requires that the molten aluminum be relatively free of inclusions such as insoluble solid or immiscible liquid impurities. This is to ensure that the ingots or billets after downstream fabrication will meet the stringent requirements of high quality products such as rigid and flexible packaging materials, aerospace products (extrusions, sheet, plate, forgings), lithographic, automotive condenser tubing and bright trim. During the production of the molten aluminum insoluble impurities or inclusions are generated throughout the entire reduction, holding, alloying and casting processes.

In the primary electrolytic reduction process un-dissolved alumina; aluminum carbides; sodium aluminum fluoride from the electrolytic bath and γ-alumina skins are carried over as impurities and inclusions. In furnace holding and alloying stages magnesium aluminate spinet, magnesia, γ-alumina skins and furnace refractories are generated as inclusions or impurities. In the metal transfer during casting chloride salts, titanium boride clusters, eroded refractories and γ-alumina skins are generated as impurities or inclusions.

It is desirable to remove the inclusions in the last processing step prior to the molten aluminum being solidified into an ingot or billet through filtration. This has been done for many years in the industry through the use of a variety of technologies, including bed filtration and ceramic foam filtration as exemplified in Brondyke, K. J. and Hess, P. D., "Filtering and Fluxing for Aluminum Alloys", Transactions of AIME, Volume 230, December 1964, pp. 1,553-1,556; U.S. Pat. No. 3,947,363, Issued Mar. 30, 1976, "Ceramic Foam", Michael J. Pryor and Thomas J. Gray; and U.S. Pat. No. 4,343,704, Issued Aug. 10, 1982, "Ceramic Foam Fitter", Jerry W. Brockmeyer.

Figure 1:
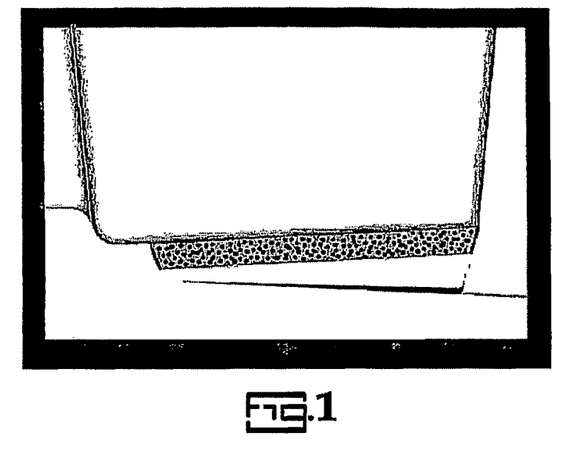
FIG. 1 is a schematic illustration of the placement of a ceramic foam filter in a filter bowl.

Open-pore ceramic foam filters for use in aluminum cast houses were developed in the early 1970's with the first commercial application of the technology in 1974 to produce rolling ingots for fabrication into plate and sheet materials. Ceramic foam filters are monolithic, one-shot or disposable, filters that are used for a single cast. Filter pore size ranges from 4 to 28 pores per cm (10 to 70 pores per linear inch), which corresponds to pore with a diameter of about 0.036 to 0.26 cm. Ceramic foam filters are typically produced in square sizes ranging from 22.86 cm×22.86 cm×5.08 cm (9 in×9 in×2 in) to 66.04 cm×66.04 cm×5.08 cm (26 in×26 in×2 in) with a 17° edge bevel for seating into a refractory filter bowl as illustrated in FIG. 1. On the bevel edge a fiber paper gasket is fixed to provide lateral compression loading to hold the filter in place in the filter bowl and to prevent metal bypass around the edge of the filter. The fiber gasket material is typically about 0.317 cm to 0.476 cm (⅛ to 3/16") thick and is typically comprised of silicate fibers. Vermiculite is oftentimes added to the gasket material, which expands during heating to increase the gasket pressure. Typical use time in the molten aluminum is 30 to 120 minutes.

During the 1980's there was rapid and widespread market acceptance of ceramic foam filtration technology for a broad range of high quality fabricated aluminum products including rigid packaging materials, lithographic sheet, aerospace products such as sheet, plate, forgings and extrusions; bright finish trim, condenser tubing, foil, architectural extrusions, foundry alloys and electrical conductor cable and wire. The subsequent rapid market acceptance and growth of the technology into aluminum cast houses of all types and levels of sophistication was due to the following reasons: ease of use and operator acceptance; operational flexibility; ability to drain after every cast; low variable operating cost; low capital installation cost; effective inclusion removal; and small foot requirements which equated to minimal floor space required for installation.

The earliest commercial ceramic foam filters were based on a chrome-alumina grain material, an aluminum orthophosphate binder and bentonite/kaolin additives to enhance slurry rheology. The chrome-alumina grain was relatively expensive and created a potential disposal problem due concerns regarding potential hexavalent chrome which is a known carcinogen. The chrome-alumina formulation was subsequently replaced by an "all alumina" formulation that incorporated alumino-silicate fiber and a mineral colloid, clay additive, while still utilizing the aluminum orthophosphate binder system of the chrome-alumina filters. This "all alumina" filter formulation has subsequently been widely used worldwide and has become the "industry standard" for ceramic foam filters used in aluminum cast houses for over 25 years. Despite the wide spread use of aluminum phosphate bonded alumina foam filter, there are several significant shortcomings to this filter formulation. The aluminum phosphate filters have poor thermal shock resistance, have a tendency to develop lateral compressive failures, lose strength during use due to attack of the aluminum phosphate bond; it has poor resistance to chemical attack and erosion of the filter structure. Further, phosphine gas can be generated from used filters, which complicates disposal.

The use of alumina grain in a ceramic foam filter would seem to be an obvious choice to anyone familiar with refractory materials used to contain molten aluminum and it's alloys. Alumina is relatively chemically inert in molten aluminum and it's common alloys, including those containing magnesium. It is also widely used as a grain material in refractories used in furnaces to both melt and hold molten aluminum alloys. Further, before the development of the one-shot disposable ceramic foam filter, tabular alumina bed filters were used to filter molten aluminum. Bed filters are large heated vessels containing un-bonded tabular alumina grains that are used for repeated casts over a period of several days or even weeks. The long exposure time of the molten metal to the un-bonded aggregate materials as in bed filters and refractories requires the use a chemically inert grain material such as alumina.

However, alumina has a relatively high coefficient of linear thermal expansion ($8.0 \times 10^{-6}$/° C.), and alumina monolithic shapes, such as ceramic foam filters, have poor thermal shock resistance due to the high thermal stresses generated by a combination of thermal gradients due to uneven heating and the high thermal expansion coefficient. During pre-heat and initial molten metal contact, the ceramic foam filter material may thermal-shock crack or spall and result in the release of filter material into the ingot or billet where it becomes an inclusion. In addition, when an alumina foam filter is restrained in a filter bowl during pre-heat and use, high lateral compressive stresses can be generated as a result of the high thermal expansion rate of the filter, leading to compression failure of the filter.

Aluminum orthophosphate (Al(H$_2$PO$_4$)$_3$) is widely used as a refractory binder in the metals industry. It develops good green strength during drying at relatively low temperature, has low green shrinkage and develops good strength during subsequent firing. Aluminum orthophosphate is relatively inexpensive, widely available and requires relatively low firing temperature (1,100° C.) to obtain the final aluminum phosphate (AlPO$_4$) bond. For these reasons, and because aluminum orthophosphate is relatively low cost, the material is widely used in the manufacture of ceramic foam filters for use in molten aluminum filtration. However, the resulting aluminum phosphate bond is subject to reaction with magnesium in many commercial aluminum alloys.

Magnesium is one of the most common alloy elements in commercial aluminum alloys. Magnesium in molten aluminum is highly reactive, has a relatively high vapor pressure and will easily penetrate into any refractory matrix where it will readily react with nearly all the common oxide materials. Aluminum phosphate is highly reactive to magnesium vapor in aluminum alloys and is not as stable as originally thought and disclosed in the Pryor and Brockmeyer patents. Instead, the material is subject to reduction by magnesium:

AlPO$_4$(s)+4Mg(g)⇒ AlP(s)+4MgO(s)

Figure 3:
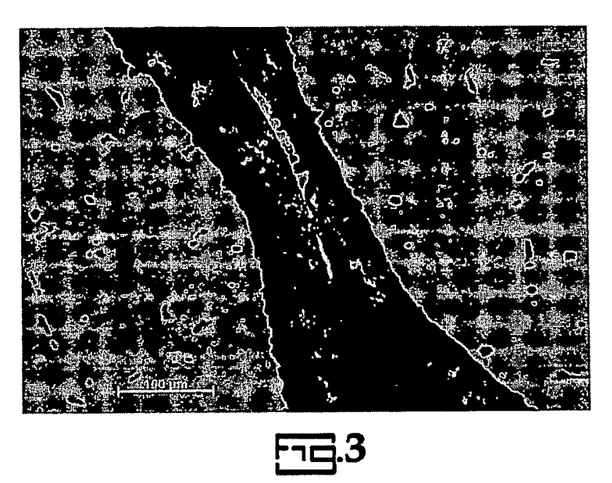
FIG. 3 is a reflective light micrograph showing intergranular attack of an aluminum phosphate bonded alumina filter after a 2-hour immersion in 4.5 wt % magnesium aluminum alloy at 725° C.

Because, the aluminum phosphate is a contiguous part of the filter matrix, the degradation of the aluminum phosphate bond leads to reduced strength or "softening" of the filter during use. The corrosive attack of the bond-phase is of an inter-granular nature, compromising the filter structure and potentially subjecting the filter to premature failure in use. The reaction occurs at even relatively low temperatures, just above the aluminum liquidus temperature, and increases rapidly with time, magnesium content and temperature. Metallurgical analysis of used filters using both optical and scanning electron microscopy confirms the degradation of the aluminum phosphate bond. FIG. 3 shows the intergranular attack of an aluminum phosphate bonded alumina filter. The above reaction results in the molten aluminum wetting into the filter structure and increased corrosion of the filter structure. Corrosion of the filter structure results in the release of alumina grain and aluminum phosphide particles into the molten aluminum where it becomes inclusion material in the alloy melt. In addition the aluminum phosphate bond does not protect the alumino-silicate fiber in the filter matrix, which is also chemically attacked.

The aluminum phosphide that remains inside of the filter after corrosive attack becomes a potential hazard in subsequent handling and disposal of the used filter. When used filter material comes into contact with atmospheric water vapor or in direct contact with water, phosphine gas will form according to the reaction:

2AlP+3H$_2$O⇒ 2PH$_3$+Al$_2$O$_3$.

Phosphine gas is a highly flammable and toxic gas. As a result used filters may require special handling.

Figure 2:
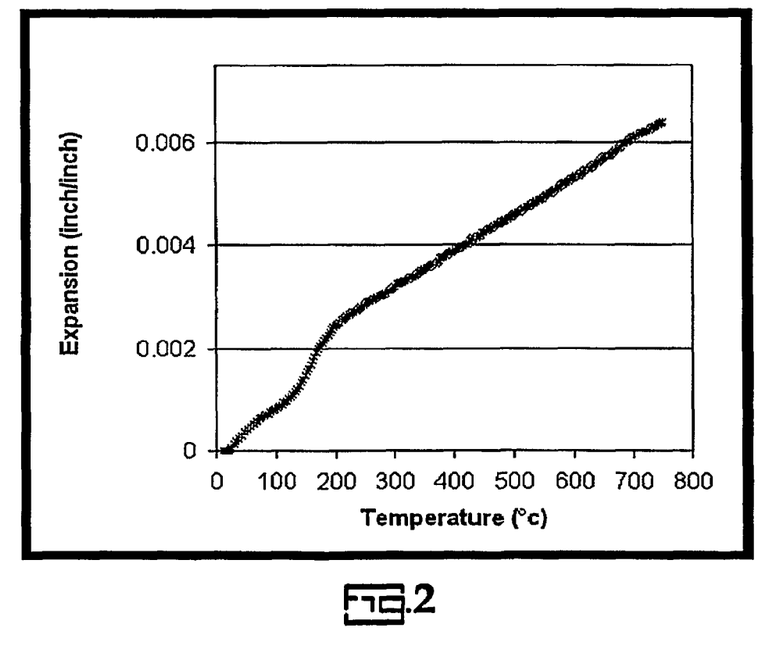
FIG. 2 graphically illustrates the percent expansion versus temperature for an aluminum phosphate bonded alumina filter, and particularly, the detrimental phase transformation which occurs at about 80-180° C.

The aluminum phosphate bond also contributes to poor thermal shock resistance. After firing the aluminum phosphate has a berlinite crystal structure, which goes through a structural phase transformation with a 2 to 3% volume increase in the 80 to 180° C. temperature range. This volume change results in abrupt expansion lowering the materials thermal shock resistance and increases the compressive lateral stress in the filter body. FIG. 2 shows thermal expansion of an aluminum phosphate bonded alumina filter and the low temperature phase transformation.

The following are the ideal material requirements for a ceramic foam filter material:
1. High Thermal Shock Resistance—the material must not crack or spall during pre-heat or molten metal contact. The material should have low thermal expansion to minimize lateral compressive stresses while seated in the filter bowl.
2. Corrosion Resistance: The filter material should not react significantly in the intended application range (time, temperature, alloy content) and must remain non-wetted by molten aluminum and it's common alloys.
3. Adequate bending and compressive strength
4. Economical to produce.
5. Filter material after use must be safe to handle and dispose.
6. Low Density or light weight for the casting pit operator to easily handle There has not yet been a filter material that provides all of these features. Provided herein is such a filter.

SUMMARY

It is an object of the present invention to provide an improved filter for molten aluminum.

It is another object of the present to provide a filter for molten aluminum, which has high thermal shock resistance, high corrosion resistance, adequate strength, is economical to produce, is environmentally friendlier than the prior art and has a low density.

A particular feature of the present invention is the ability to utilize relative inexpensive starting materials while still achieving superior performance.

These and other advantages, as will be realized, are provided in a ceramic foam filter for molten aluminum alloys comprising an alumina-silicate rich core and a boron glass shell and a chemical composition comprising: 20-70 wt % Al$_2$O$_3$, 20-60 wt % SiO$_2$, 0-25 wt % of at least one Group II oxide and 2-20 wt % B$_2$O$_3$.

Yet another embodiment is provided in a process for forming a ceramic foam filter. The process includes forming a slurry comprising a solid phase comprising 20-70 wt % alumina, 20-60 wt % silica, 0-20 wt % calcium compound, 0-20 wt %; magnesia and 2-20 wt % boron compound and a carrier phase; impregnating an open cell foam with the slurry; volatilizing the carrier; and sintering.

A particularly preferred embodiment is provided in a ceramic foam filter comprising 65-85 wt % of a core and 15-35 wt % of a shell encasing the core wherein the core comprises alumina silicate and wherein the shell comprises 15-45 wt % alumina, 2-35 wt % silica, 15-50 wt % boron oxide and 0-25 wt % of at least one group II oxide preferably calcium, barium, magnesium or strontium.

DETAILED DESCRIPTION

The present invention is directed to a porous filter, which is particularly suitable for filtering molten aluminum or aluminum alloys. The filter has a basic composition of 20-70 wt % $Al_2O_3$, 20-60 wt % $SiO_2$, 0-25 wt % a Group II oxide and 2-20 wt % $B_2O_3$ in a core shell configuration with the core being alumina and silica rich and the shell comprising a boron glass composition encasing the core. More preferably, the basic composition comprises 40-60 wt % $Al_2O_3$, 30-50 wt % $SiO_2$, 0-10 wt % CaO; 0-10 wt % MgO and 3-10 wt % $B_2O_3$ The Group II oxide preferably include at least one oxide of calcium, magnesium, strontium and barium.

The composition of the filter most preferably has a core representing 65-85 wt % and a shell representing 15-35 wt %. More preferably the core represents 70-80 wt % of the filter with the balance being the shell. The shell encapsulates the core thereby protecting the core from chemical attack during filtering and particularly attack by magnesium.

The core preferably comprises 45-60 wt % alumina and 40-55 wt % silica. The alumina and silica are preferably incorporated as an alumina silicate such as mullite, kyanite, silimanite, calcined kaolin and andalusite. Kyanite is most preferred. Other potential core materials are other low or zero thermal expansion silicate materials such as fused silica, lithium-aluminum-silicates (petalite), and magnesium-aluminum-silicates (cordierite).

The shell is primarily a boron glass bonded matrix, which encases the core. The shell preferably comprises 15-45 wt % alumina, 2-35 wt % silica, 15-50 wt % boron oxide and 0-25 wt % at least one Group II oxide. More preferred is 15-25 wt % alumina. More preferred is 5-10 wt % silica. More preferred is 30-50 wt % boron oxide. The Group II oxide is preferably selected from calcium, strontium, barium and magnesium.

Figure 4:
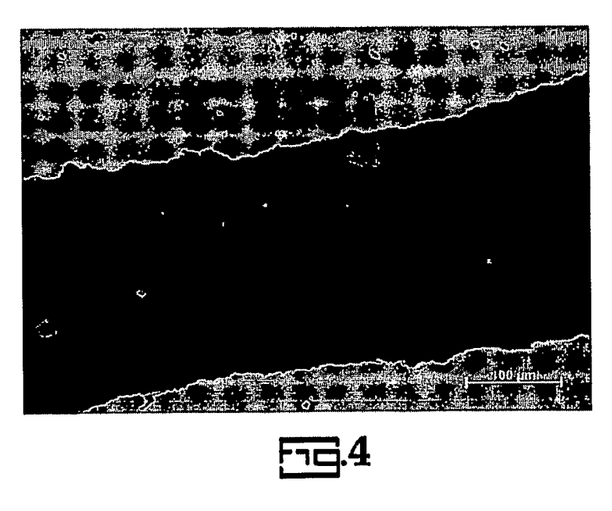
FIG. 4 illustrates a reflective light micrograph showing an inventive filter after a 2-hour immersion in 4.5 wt % magnesium aluminum alloy at 725° C.

The present invention takes a different approach from earlier ceramic foam filter technology. A low thermal expansion alumino-silicate grain, most preferably kyanite or mullite, is used instead of alumina to obtain improved thermal shock resistance and to reduce lateral compressive stress. Mullite and kyanite however are reactive with molten aluminum and its alloys. To protect grain material from chemical attack, a relatively inert binder phase is used based on a complex boron glass containing a Group II oxide, preferably calcia or magnesia; alumina and silica. The boron glass bond is contiguous in the overall filter matrix forming a core-shell structure with a boron glass shell completely encapsulating and protecting the aggregate grain core from attack by magnesium vapor. This boron glass bond develops good green strength at low temperature and acts to flux and bond the kyanite grains together during firing. This new filter body in molten metal tests shows superior resistance to magnesium vapor attack. FIG. 4 shows the new filter after immersion testing in a 4.5% magnesium aluminum alloy for 2 hours at 725° C. which are the same conditions used for the aluminum phosphate bonded filter shown in FIG. 3.

Other metal oxide materials may exist in the formulation in small quantities typically less than 3 wt % as impurities. These include $K_2O$, $Na_2O$, $Fe_2O_3$, $TiO_2$, among others.

The ceramic foam material has an open cell structure with a distribution of connected voids that are surrounded by webs of ceramic material. Such a structure is commonly used for molten metal filtration and is known in the industry as ceramic foam.

The ceramic foam filter of this invention has a thermal expansion rate in the range of $1.5$-$7.5 \times 10^{-6}$ mm/mm/° C. More preferably the ceramic foam filter of this invention has a thermal expansion rate in the range of $5.0$-$6.0 \times 10^{-6}$ mm/mm/° C.

The ceramic foam filter is shown to be resistant to chemical attack by molten aluminum alloys under typical use conditions.

The ceramic foam filter is lightweight with a preferred density of about 0.25-0.40 g/cc.

The filter is shown to be substantially non-reactive and does not generate phosphine gases or reactive materials after filtering molten aluminum alloys. The state-of-the-art phosphate bonded alumina filters have been shown to generate phosphine gases and to be subject to catching on fire after use.

It is preferable to incorporate ceramic fibers, which strengthen the material. Particularly preferred fibers include alumina, silica and silicates of aluminium, magnesium, calcium and combinations thereof. Pyrolog® fibers are particularly preferred. Pyrolog® fibers comprise about 47 wt % $Al_2O_3$ and about 53 wt % $SiO_2$. Other preferred fibers are Isofrax® 1260 fiber (magnesium silicate) or Insufrax® 3010/3011 fiber (CaMg silicate).

In one embodiment the shell comprises a boron containing glass powder. A particularly preferred boron containing glass is B40C, available from Matrix Enterprises, comprising about 30.8 wt % $Al_2O_3$, 2.4 wt % $SiO_2$, 23.25 wt % CaO, 41.38 wt % $B_2O_3$, 1.47 wt % $Na_2O$ with the balance being impurities such as $Fe_2O_3$, $K_2O$ and MgO.

The filter has it's primary porosity imparted by the macro structure of the foam, which is an exoskeleton of the polyurethane precursor, which is replicated by coating with slurry followed by drying and firing. The primary pore size is typically 3 to 100-ppi and more preferably 20-70 ppi.

During the sintering process dispersed micro-porous voids form in the boron glass binder phase. This dispersed micro-porosity is believed to further improve the thermal shock resistance since the voids tend to blunt the propagation of any thermal shock cracks that may develop. The overall coefficient of thermal expansion is significantly lower than that of the phosphate bonded alumina filter. The micro-porosity has a pore size of about 0.1 to 10 microns and more preferably 0.5 to 5 microns.

Kyanite is a high-pressure polymorph of the alumino-silicates of the nesosilicate group, which includes kyanite, silimanite, and andalusite. These three aluminous or alumina-rich minerals are chemically identical with the composition, $Al_2SiO_5$, but have different crystal structures.

The ceramic foam material is made through the impregnation of an aqueous slurry onto the struts of a flexible open-cell foam precursor. Subsequent drying and firing of the material creates the final ceramic foam product.

The precursor could be of any type of material that has resilience sufficient to recover its original shape after compression. Generally polyurethane foam is used for this purpose.

The ceramic slurry is prepared through mixing the desired ingredients together to form an aqueous suspension of particles. The slurry preferably has rheology characteristics such that the slurry flows easily with applied stress such as during the impregnation of the slurry into the polyurethane foam, but does not flow when the stress is removed. Such slurry has an inherent high yield stress and thixotropic characteristics.

In the preparation of the material of this invention, the starting ingredients preferably have a high content of kyanite grain of size −325 mesh. The material generally has a nominal particle size of typically less than 44 microns. However, it is acceptable to utilize a Kyanite grain size coarser or finer than this. A commonly available grain size is −270 mesh, with a nominal particle size typically less than 53 microns.

Kyanite powder is a commonly available raw material used widely in a number of ceramic products. The Kyanite powder is a mined, cleaned and calcined product containing approximately 95% Kyanite mineral, 3% quartz and 2% other materials or impurities. The powder used generally has a make-up of approximately 58 wt % $Al_2O_3$, 40 wt % $SiO_2$, 1% $TiO_2$ and a balance of impurities. Kyanite mineral is known to transform to the lower-density mullite crystalline phase at temperatures greater than 1200° C. This transformation is irreversible.

This invention demonstrates the use of Kyanite powder in the manufacture of the ceramic foam filters, but any aluminosilicate, amorphous silica, magnesium aluminum silicate, or lithium aluminum silicate, powder could be used equally effectively. Examples of such commercially available materials include mullite, cordierite, petalite, or fused silica.

The invention preferably utilizes Kyanite powder in the aqueous slurry in a range of 40-60 wt %. It is thought that the Kyanite material generates a stable grain structure that imparts low thermal expansion characteristics to the finished product. Further, the raw material is cost-effective in bulk quantities and of long-term stable supply.

The aqueous slurry additionally utilizes a boron-containing raw material that provides a glass phase former for the final product during firing. Exemplary raw materials include boric acid, boric oxide, colemanite, calcium borate or boron-containing glasses. Boric acid is most preferred. The boron-containing material used in a concentration of 2-25 wt % in the aqueous slurry provides for a glass forming system with other slurry ingredients in the firing process. This glass comprises the shell material, that in-turn protects the aluminosilicate grain from attack by the molten aluminum alloys in use.

The aqueous slurry preferably comprises adjuvants for controlling various properties. Particularly preferred adjuvants include surfactants, rheology modifiers, anti-foamants, sintering aids, solvents, dispersants and the like. The slurry can be defined as having a solid phase and a carrier phase wherein the solid phase includes the ceramic precursors and the carrier phase includes solvents and adjuvants. Water is the preferred solvent or carrier.

Drying of the ceramic material after impregnation of the precursor foam with the aqueous ceramic slurry is generally performed in a convection-type dryer at a temperature between 100° F. and 600° F. for a duration of between 15 minutes and 6 hours. Shorter durations are desirable for process economics and high manufacturing rates.

Firing of the ceramic material generally occurs at temperatures above which the glassy phase of the material can form and bond, and so create the strength and corrosion resistance characteristics that are desired in the final product. Firing is generally performed in a continuous furnace at a temperature greater than 1100° C. over a duration of 1-3 hours, with peak temperatures maintained for 15 minutes to one hour. Lower temperatures and shorter durations improve manufacturing economics. However, sufficient time and temperature must be provided to achieve the desired strength and corrosion resistance properties of the material.

The filter pore size is dictated principally by the starting pore size of the polymeric foam used in the process. For effective aluminum alloy filtration, typical primary pore sizes are between 10 and 70 pores per linear inch. However, each application will require a unique pore size, depending upon requirements for the cast shop or billet maker in terms of required filtration effectiveness and desired filter permeability for the application.

The rate of thermal expansion of the completed filter is between $1.5 \times 10^{-6}$ mm/mm/° C. and $7.5 \times 10^{-6}$ mm/mm/° C. More preferably the rate of thermal expansion of the completed filter is between $5.0 \times 10^{-6}$ mm/mm/° C. and $6.5 \times 10^{-6}$ mm/mm/° C. This test is performed according to ASTM E831.

The Modulus of Rupture (MOR) is a common test used to test the strength of ceramic materials. In the test, a test bar nominally 12"×2"×2" is broken in three-point loading with a lower span of 6". The maximum force required to break the test bar is recorded and the MOR is calculated as:

$$MOR = \frac{3PL}{2Wt^2}$$

where P is the breaking load, L is the span, W the part width, and t the part thickness. For the ceramic foam filter of this invention, the MOR is greater than 50 psi at a relative density of less than 11%.

Corrosion testing of the final product is critical to evaluate the ability of the material to withstand the corrosive environment of aluminum alloy. Corrosion testing is performed through laboratory testing, field-testing or both. In laboratory testing, small sample coupons are cut from representative materials and exposed to a hot, corrosive aluminum alloy for a specified period of time. The alloy used is selected to contain at least 4.5 wt % magnesium to represent the worst case for alloy corrosion conditions. A variety of melt temperatures are explored to evaluate the impact of variation of operating conditions in the field. In this laboratory testing, the sample must be continuously exposed to fresh metal to ensure that field conditions are approximated as closely as possible. To accomplish this, the sample is either stirred while submerged in the molten alloy, or it is continuously raised and lowered to impart flow through the porosity of the ceramic foam filter sample. After at least two hours of metal exposure of this type, the sample is removed from the molten metal and cooled quickly upon an aluminum chill plate. This rapid directional solidification ensures that a relatively sound or porosity-free sample is obtained for subsequent metallurgical analysis.

In field-testing, an entire filter is tested in a production environment using a semi-continuous vertical direct chill process. Test time is typically 35 to 120 minutes. The test site is selected where AA6063 or AA6061 or other magnesiumbearing aluminum alloy is used. Standard filter gaskets and filter preheating conditions are used. The data gathered during the testing includes metal flow rate and casting conditions, molten metal temperature and visual observations regarding the filter condition during pre-heat and immediately after casting. After casting the used filters are subjected to metallurgical analysis to evaluate their ability to withstand the corrosive molten aluminum alloy.

Pore size is typically referred to in the art as the number of pores in a linear dimension such as pores per inch. A higher ppi value has a smaller cell diameter. This is a standard method of reporting pore size.

In the present description the term aluminum alloy is intended to be inclusive with aluminum.

The density of porous ceramic materials is typically reported as a relative density. A relative density is the ratio of measured density to theoretical density wherein theoretical density assumes no voids.

Example 1

A ceramic foam material of the present invention was made following conventional ceramic foam manufacturing techniques. In the example, an aqueous slurry was made from the following ingredients:

| Ingredient | Content (wt %) |
| --- | --- |
| Kyanite powder | 57.8% |
| A3000 alumina powder | 3.9% |
| Magnesium hydroxide powder | 1.6% |
| Boric acid powder | 3.9% |
| Glass Powder (B40C, Matrix Enterprises) | 7.9% |
| Water | 20.8% |
| Dispersant | 0.4% |
| xanthan gum rheology modifier | 0.1% |
| Alumina-silicate fiber | 0.8% |
| Surfactant | 0.2% |
| Colloidal Silica | 2.6% |

The ingredients were mixed together to form a substantially homogeneous aqueous slurry with a mixture viscosity in the range of 10,000 to 20,000 Cp. The slurry was then impregnated into the pores of a polyurethane foam precursor having a desired pore size near 30 pores per linear inch (ppi). The slurry was then squeezed out of the polyurethane foam with rollers, and the process repeated until a uniform coating of slurry was coated onto the struts of the polyurethane foam. In the process, the gap between the rollers was set such that the desired final product would have a relative density of 10-12%.

The filter was then dried in a convection oven to remove the liquid phase in the slurry to develop green strength or a rigid article. The filter was then fired in a roller hearth to a peak temperature of 1185° C. over a two-hour duration, to yield the final product. Several filters were made from the same recipe and used for various characterization measurements.

The product had a final theoretical composition of 53.9 wt % $Al_2O_3$, 33.2 wt % $SiO_2$, 2.5 wt % CaO, 1.4 wt % MgO, 7.3 wt % $B_2O_3$, 1.0 wt % $TiO_2$ with the balance of 0.7% being impurities such as $K_2O$, $Na_2O$, $Fe_2O_3$ and others.

Figure 5:
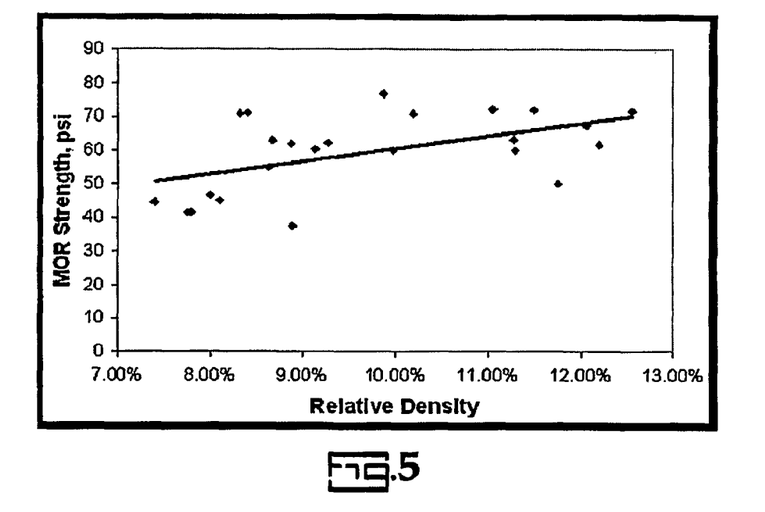
FIG. 5 graphically illustrates MOR as a function of relative density for an inventive filter.
Figure 6:
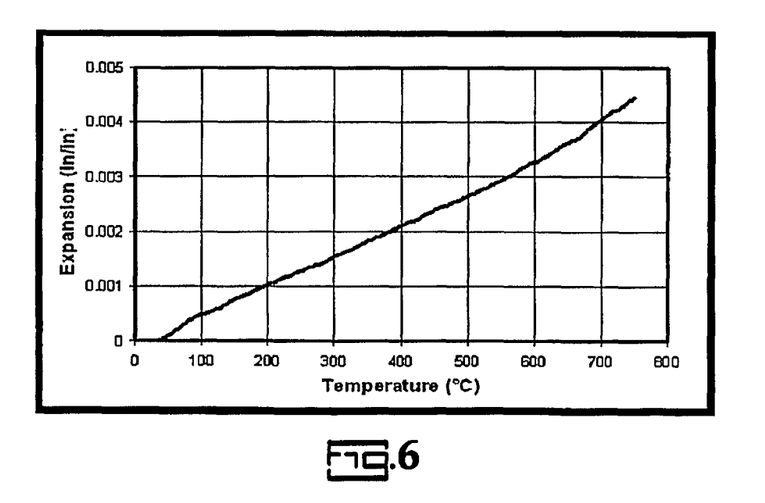
FIG. 6 graphically illustrates expansion as a function of temperature for an inventive filter.

The material was cut into strips to measure the product modulus of rupture (MOR). FIG. 5 shows the results for the filter of this example. The filter was also cut to yield a sample for thermal expansion characterization. FIG. 6 shows the results of the thermal expansion of the material of this example. From this curve, the average thermal expansion rate of the material was found to be $6.0 \times 10^{-6}$ in/in/° C.

Figure 7:
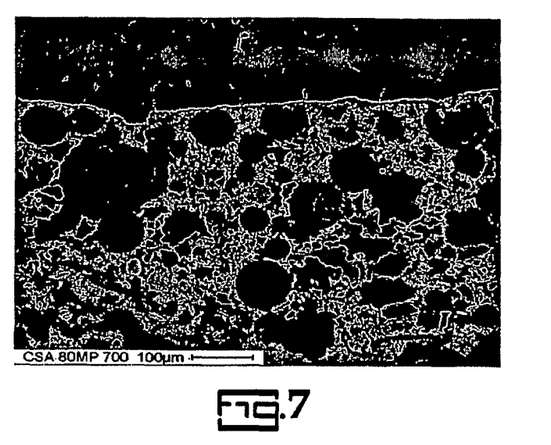
FIG. 7 is a backscatter electron micrograph showing micro-porous filter material that did not react with molten aluminum and remained non-wetted during testing.

A 3.8 cm×5.08 cm×45.72 cm (1.5 in×2.0 in×18 in) test bar was prepared for molten metal immersion testing to verify the corrosion resistance and non-wetting behavior in a 4.5% MgAl alloy. The test bar pore size was 3.93 pores per cm (10-ppi) and was made in a manner similar to that described for the other materials of this example. However, the test bar slurry had 80-micron diameter polymer micro-spheres added to the slurry to impart controlled micro-porosity for the purposes of corrosion testing. The concept of adding polymer spheres for the purpose of generating porosity in the material has been disclosed in U.S. Pat. No. 6,036,743. The intent was to see if the highly micro-porous filter material would resist molten metal wetting and infiltration during the corrosion test. The test bar was submerged into a 12" deep crucible of molten aluminum being held at 750° C. The test bar was then rotated in the crucible to ensure that the molten metal flowed through the pores of the ceramic foam bar during the test. The duration of the corrosion test was 2.5 hours. At the test conclusion the test bar was removed from the crucible and the bottom end was solidified against an aluminum chill plate. A section of the test bar was then cut from the bottom end of the test bar, and a metallographic sample was prepared by grinding and polishing. FIG. 7 is a scanning electron micrograph showing the filter-metal interface. FIG. 7 shows the filter material including the spherical micro-pores remained non-wetting and non-reactive with the molten 4.5% MgAl alloy. This is considered to be a very severe test based on the high metal temperature (750° C.), the test duration (2.5 hours), the immersion depth (12"), the pore size and the high magnesium content.

Example 2

In this example, the ingredients were as follows:

| Ingredient | Content (wt %) |
| --- | --- |
| Kyanite powder | 63.1% |
| Magnesium hydroxide powder | 1.6% |
| Boric acid powder | 3.9% |
| Glass Powder (B40C, Matrix Entriprises) | 7.7% |
| Water | 22.3% |
| Dispersant | 0.4% |
| xanthan gum rheology modifier | 0.1% |
| Alumina-silicate fiber | 0.8% |
| Surfactant | 0.1% |

The ingredients were used to manufacture a ceramic foam material in a manner similar to that described in Example 1. The final material had a theoretical composition of 52.3 wt % $Al_2O_3$, 34.9 wt % $SiO_2$, 2.4 wt % CaO, 1.4 wt % MgO, 7.2 wt % $B_2O_3$, $TiO_2$ 1.1 wt % with the balance of 0.7 wt % being impurities such as $K_2O$, $Na_2O$, $Fe_2O_3$ and others.

The product MOR was measured to have an average of 56.5 psi at an average 11.6% relative density, and an average crushing strength of 64.4 psi at an average 11.0% relative density.

It is preferable for the filter materials to have an elastic modulus of no more than about 300 GPa and more preferably no more than about 150 GPa.

Figure 8:
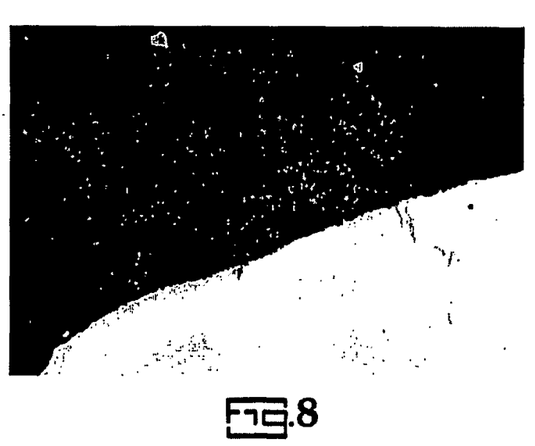
FIG. 8 is an optical photomicrograph of a filter material of the invention showing a filter-metal interface, which is neither wetted nor reacted during testing.

Filters with a size of 50.8 cm×50.8 cm by 5.08 cm (20 in×20 in×2 in) were prepared using the above slurry formulation for testing in a production aluminum cast house producing AA6063 (0.90% Mg) extrusion billet by the direct chill casting process. Filter pore size for this test was 30-ppi, and the filter relative density was about 11.5%. The casting time was approximately 40 to 50 minutes and metal temperature in the filter bowl ranged from 680 to 720° C. Metal flow rate was from 344.7 to 453.2 Kg (760 to 933 pounds) per minute depending on the billet diameter and the number of strands being cast. Used filters were saved for metallurgical evaluation for the detection of any reaction between the filter material and molten aluminum alloy, and to determine whether the filter remained non-wetting. FIG. 8 is an optical micrograph showing that the filter material did not react with the molten aluminum alloy and remained non-wetting.

Example 3

In this example, the ingredients were as follows:

| Ingredient | Content (wt %) |
|---|---|
| Kyanite powder | 59.1% |
| Wollastonite powder | 5.7% |
| Boric acid powder | 8.1% |
| Colloidal alumina | 7.3% |
| Water | 18.5% |
| Dispersant | 0.4% |
| xanthan gum rheology modifier | 0.1% |
| Alumina-silicate fiber | 0.8% |

The ingredients were used to manufacture a ceramic foam material in a manner similar to that described in Example 1. The final material had a theoretical composition of 50.7 wt % $Al_2O_3$, 37.3 wt % $SiO_2$, 4.0 wt % CaO, 6.3 wt % $B_2O_3$, 1.0 wt % $TiO_2$ with the remaining 0.7 wt % being impurities such as $K_2O$, $Na_2O$, $Fe_2O_3$ and other materials.

The ceramic foam parts were evaluated for product strength, and corrosion resistance testing. Average MOR of the product was measured to be 75.5 psi at an average relative density of 10.5%. The product lateral crush strength averaged 72.2 psi at an average relative density of 9.8%.

Cylindrically shaped test filters from the above material were obtained using a 1.30" diameter diamond core drill. These samples (2" thick) were then inserted inside an 18" long mullite tube and retained in place inside the tube using a heat expandable fiber gasket. The filter-tube assemblies were then pre-heated and then immersed into a 12" deep crucible containing molten 4.5% MgAl for a test duration time of 2 hours. Immersion tests were run at 675, 700, 725 and 750° C. During the immersion testing the filter-tube assemblies were continuously raised and lower to simulate the metal flow rate typically encountered in a field application. At the end of the test the filter-tube assemblies were removed and the lower end containing the filter was solidified against an aluminum chill plate. Metallographic samples were then prepared from the filter material and evaluated using optical microscopy.

Figure 9:
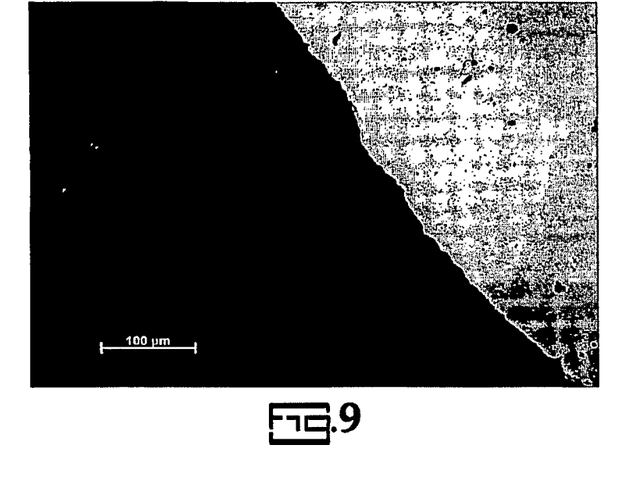
FIG. 9 is an electron micrograph of an inventive example after testing in molten MgAl alloy for 2 hours at 750° C. illustrating the absence of reactivity and wetting at the metal-filter interface.

An electron micrograph of the sample of Example 3 is illustrated in FIG. 9 after testing in molten aluminum with 4.5 wt % magnesium for 2 hours at 750° C. As illustrated in FIG. 9 there is an absence of any molten metal-filter reaction and the filter material remained non-wetted even under these relatively severe conditions. In FIG. 9 the smooth appearing regions are the core and the matrix surrounding the core is the shell.

Example 4

Figure 10:
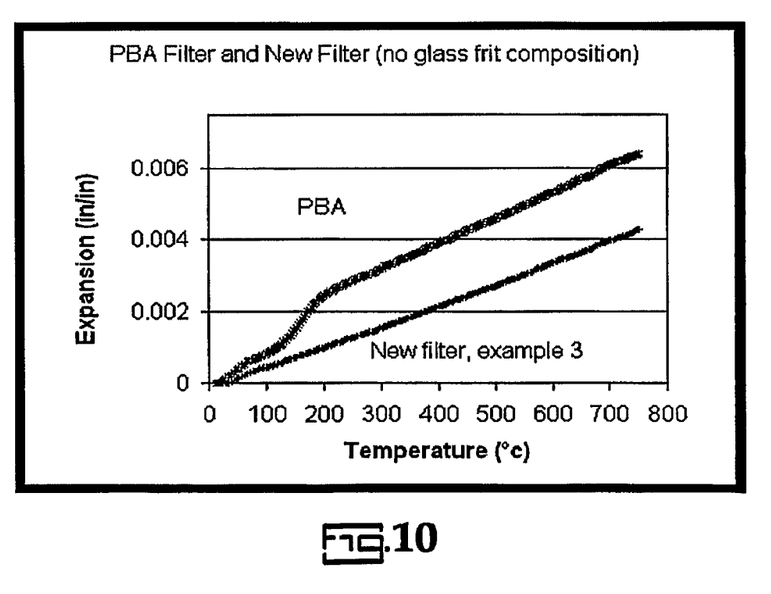
FIG. 10 graphically illustrates a comparison of percent expansion for a prior art phosphate bonded alumina (PBA) filter with an inventive filter.

A filter was prepared comprising a core representing 65% to 85 wt % of the filter comprising kyanite with about 57.5 wt % $Al_2O_3$ and 40.3 wt % $SiO_2$ with the balance being impurities normally associated with kyanite such as $K_2O$, $Na_2O$, $Fe_2O_3$, $TiO_2$ and MgO. The shell represents about 15% to 35 wt % of the filter comprising about 19.82 wt % $Al_2O_3$, 23.3 wt % $SiO_2$, 21.94 wt % CaO and 34.75 wt % $B_2O_3$ with the balance being impurities such as $K_2O$, $Na_2O$, $Fe_2O_3$, $TiO_2$ and MgO. FIG. 10 illustrated the thermal expansion improvement of Example 4 relative to the prior art.

Example 5

A filter was prepared comprising a core representing 65% to 85 wt % of the filter comprising kyanite with about 57.5 wt % $Al_2O_3$ and 40.3 wt % $SiO_2$ with the balance being Impurities normally associated with kyanite such as $K_2O$, $Na_2O$, $Fe_2O_3$, $TiO_2$ and MgO. The shell represents about 15% to 35 wt % of the filter comprising about 40.79 wt % $Al_2O_3$, 7.8 wt % $SiO_2$, 11.05 wt % CaO, 32.98 wt % $B_2O_3$, 6.37 wt % MgO with the balance being impurities such as $K_2O$, $Na_2O$, $Fe_2O_3$ and $TiO_2$. In this embodiment the shell had incorporated therein, prior to firing, a glass powder B40C glass powder with the remaining materials being added to reach the desired ratio of components. Also the additional silica is colloidal silica.

Example 6

A filter was prepared comprising a core representing 65% to 85 wt % of the filter comprising kyanite with about 57.5 wt % $Al_2O_3$ and 40.3 wt % $SiO_2$ with the balance being Impurities normally associated with kyanite such as $K_2O$, $Na_2O$, $Fe_2O_3$, $TiO_2$ and MgO. The shell represented about 15% to 35 wt % of the filter comprising about 23.65 wt % $Al_2O_3$, 4.89 wt % $SiO_2$, 15.36 wt % CaO, 45.84 wt % $B_2O_3$, 8.85 wt % MgO with the balance being impurities such as $K_2O$, $Na_2O$, $Fe_2O_3$ and $TiO_2$. In this embodiment the shell had incorporated therein, prior to firing, a glass frit B40C glass powder with the remaining materials added to reach the desired ratio of components.

The invention has been described with particular reference to the preferred embodiments without limit thereto. Additional embodiments and alterations will be realized based on the teachings herein without departure from the meets and bounds of the invention which are more specifically set forth in the claims appended hereto.

What is claimed is:

1. A ceramic foam filter for molten aluminum alloys comprising an alumina silicate rich core and a boron glass shell wherein said filter has a chemical composition comprising: 20-70 wt % $Al_2O_3$, 20-60 wt % $SiO_2$, 0-25 wt % at least one Group II oxide, and 2-20 wt % $B_2O_3$.

2. The ceramic foam filter for molten aluminum alloys of claim 1 comprising 65-85 wt % of said core and 15-35 wt % of said shell.

3. The ceramic foam filter for molten aluminum alloys of claim 2 comprising 70-80 wt % of said core.

4. The ceramic foam filter for molten aluminum alloys of claim 1 wherein said core is encased by said shell.

5. The ceramic foam filter for molten aluminum alloys of claim 1 wherein said core comprises 45-60 wt % alumina and 40-55 wt % silica.

6. The ceramic foam filter for molten aluminum alloys of claim 1 wherein said alumina silicate comprises at least one material selected from the group consisting of mullite, kyanite, silimanite, calcined kaolin and andalusite.

7. The ceramic foam filter for molten aluminum alloys of claim 6 wherein said core comprises kyanite.

8. The ceramic foam filter for molten aluminum alloys of claim 1 wherein said Group II oxide comprises at least one of magnesium, calcium, strontium and barium.

9. The ceramic foam filter for molten aluminum alloys of claim 8 wherein said Group II oxide comprises at least one of magnesium and calcium.

10. The ceramic foam filter for molten aluminum alloys of claim 1 wherein said shell comprises 15-45 wt % alumina, 2-35 wt % silica, 0-25 wt % calcium oxide, 15-50 wt % boron oxide and 0-25 wt % magnesium oxide.

11. The ceramic foam filter for molten aluminum alloys of claim 10 wherein said shell comprises 15-35 wt % alumina.

12. The ceramic foam filter for molten aluminum alloys of claim 11 wherein said shell comprises 15-25 wt % alumina.

13. The ceramic foam filter for molten aluminum alloys of claim 10 wherein said shell comprises 10-35 wt % silica.

14. The ceramic foam filter for molten aluminum alloys of claim 10 wherein said shell comprises 5-10 wt % silica.

15. The ceramic foam filter for molten aluminum alloys of claim 10 wherein said shell comprises 20-50 wt % boron oxide.

16. The ceramic foam filter for molten aluminum alloys of claim 15 wherein said shell comprises 30-50 wt % boron oxide.

17. The ceramic foam filter for molten aluminum alloys of claim 1 wherein said shell comprises a boron containing glass powder.

18. The ceramic foam filter for molten aluminum alloys of claim 1 wherein said shell comprises fiber.

19. The ceramic foam filter for molten aluminum alloys of claim 18 wherein said fiber comprises a material selected from the group consisting of alumina, and alumina silicate.

20. The ceramic foam filter for molten aluminum alloys of claim 18 wherein said fiber comprises a material selected from CaMg silicate and magnesium silicate fibers.

21. The ceramic foam filter for molten aluminum alloys of claim 18 wherein said fiber comprises 70-80 wt % $SiO_2$ and 18-27 wt % MgO.

22. The ceramic foam filter for molten aluminum alloys of claim 1 having a theoretical density in the range of 7 to 18%.

23. The ceramic foam filter for molten aluminum alloys of claim 1 having a primary pore size of 3 ppi to 100 ppi.

24. The ceramic foam filter for molten aluminum alloys of claim 1 having a primary pore size of 20 ppi to 70 ppi.

25. The ceramic foam filter for molten aluminum alloys of claim 1 wherein said shell has micro-pores with a pore size of 0.1 to 10 microns.

26. The ceramic foam filter for molten aluminum alloys of claim 1 wherein said shell has micro-pores with a pore size of 0.5 to 5 microns.

27. The ceramic foam filter for molten aluminum alloys of claim 1 having a thermal expansion rate of at least $1.5 \times 10^{-6}$ mm/mm/° C. to no more than $7.5 \times 10^{-6}$ mm/mm/° C.

28. The ceramic foam filter for molten aluminum alloys of claim 1 having a thermal expansion rate of at least $5 \times 10^{-6}$ mm/mm/° C. to no more than $6.5 \times 10^{-6}$ mm/mm/° C.

29. The ceramic foam filter for molten aluminum alloys of claim 1 having a modulus of rupture of at least 50 psi at a theoretical density of less than 11%.

30. The ceramic foam filter for molten aluminum alloys of claim 1 having a density of 0.25-0.4 g/cc.

31. The ceramic foam filter for molten aluminum of claim 1 being substantially resistant to chemical attack by molten aluminum alloys in exposure to said alloys for durations of less than two hours.

32. The ceramic foam filter for molten aluminum alloys of claim 1 being substantially non-wetted by molten aluminum alloys in exposure to said alloys for durations of less than two hours.

33. A ceramic foam filter comprising 65-85 wt % of a core and 15-35 wt % of a shell encasing said core wherein said core comprises alumina silicate and said shell comprises 15-45 wt % alumina, 2-35 wt % silica, 0-25 wt % calcium oxide, 15-50 wt % boron oxide and 0-25 wt % magnesium oxide.

34. The ceramic foam filter of claim 33 comprising 70-80 wt % of said core.

35. The ceramic foam filter of claim 33 wherein said core comprises 45-60 wt % alumina and 40-55 wt % silica.

36. The ceramic foam filter of claim 33 wherein said alumina silicate comprises at least one material selected from the group consisting of mullite, kyanite, silimanite, calcined kaolin and andalusite.

37. The ceramic foam filter of claim 36 wherein said alumina comprises kyanite.

38. The ceramic foam filter of claim 33 wherein said shell comprises 15-35 wt % alumina.

39. The ceramic foam filter of claim 38 wherein said shell comprises 15-25 wt % alumina.

40. The ceramic foam filter of claim 33 wherein said shell comprises 10-35 wt % silica.

41. The ceramic foam filter of claim 33 wherein said shell comprises 5-10 wt % silica.

42. The ceramic foam filter of claim 33 wherein said shell comprises 20-50 wt % boron oxide.

43. The ceramic foam filter of claim 33 wherein said shell comprises 30-50 wt % boron oxide.

44. The ceramic foam filter of claim 33 wherein said shell comprises a glass powder.

45. The ceramic foam filter of claim 33 wherein said shell comprises fiber.

46. The ceramic foam filter of claim 45 wherein said fiber comprises a material selected from the group consisting of alumina, silica and alumina silicate.

47. The ceramic foam filter of claim 45 wherein said fiber comprises a material selected from calcium silicate and magnesium silicate fibers.

48. The ceramic foam filter of claim 45 wherein said fiber comprises 70-80 wt % $SiO_2$ and 18-27 wt % MgO.

49. The ceramic foam filter of claim 33 having a theoretical density in the range of 7 to 18%.

50. The ceramic foam filter of claim 33 having a density of 0.25 to 0.40 g/cc.

51. The ceramic foam filter of claim 33 having a primary pore size of 3 ppi to 100 ppi.

52. The ceramic foam filter of claim 33 having a primary pore size of 20 ppi to 70 ppi.

53. The ceramic foam filter of claim 33 wherein said shell has micropores with a pore size of 0.1 to 10 microns.

54. The ceramic foam filter of claim 53 wherein said shell has micropores with a pore size of 0.5 to 5 microns.

55. The ceramic foam filter of claim 33 having a thermal expansion rate of at least $1.5 \times 10^{-6}$ mm/mm/° C. to no more than $7.5 \times 10^{-6}$ mm/mm/° C.

56. The ceramic foam filter of claim 33 having a thermal expansion rate of at least $5 \times 10^{-6}$ mm/mm/° C. to no more than $6.5 \times 10^{-6}$ mm/mm/° C.

57. The ceramic foam filter of claim 33 having a lateral compressive strength of at least 50 psi at a theoretical density of less than 11%.

58. The ceramic foam filter of claim 33 having a modulus of rupture of at least 50 psi at a theoretical density of less than 11%.

59. The ceramic foam filter of claim 33 being substantially resistant to chemical attack by molten aluminum alloys in exposure to said alloys for durations of less than two hours.

60. The ceramic foam filter of claim 33 being substantially non-wetted by molten aluminum alloys in exposure to said alloys for durations of less than two hours.

* * * * *